June 21, 1960

J. O. NESBITT 2,941,400

PILOT'S FLIGHT CONTROL INDICATOR

Filed Sept. 29, 1955

INVENTOR
JAMES O. NESBITT

BY

ATTORNEYS

June 21, 1960   J. O. NESBITT   2,941,400
PILOT'S FLIGHT CONTROL INDICATOR
Filed Sept. 29, 1955                                   2 Sheets-Sheet 2

INVENTOR
JAMES O. NESBITT
BY
ATTORNEYS

United States Patent Office 2,941,400
Patented June 21, 1960

2,941,400

PILOT'S FLIGHT CONTROL INDICATOR

James O. Nesbitt, 5208 28th Ave. S.E., Washington, D.C.

Filed Sept. 29, 1955, Ser. No. 537,597

16 Claims. (Cl. 73—178)

(Granted under Title 35, U.S. Code (1952), sec. 266)

The invention described herein may be manufactured and used by or for the Government of the United States of America for governmental purposes without the payment of any royalties thereon or therefor.

The present invention relates to a flight control indicator wherein the functions of a plurality of separate instruments usually employed in piloting aircraft are combined in a single instrument for convenient reading by the pilot. The indicator of the present invention provides information required to pilot an aircraft and obviates the necessity of shifting from one instrument to another during the piloting of the aircraft through various phases of operation.

Prior art instruments generally are such that each flight factor is presented on a separate indicator, among which the artificial horizon provides the primary cues for control of the aircraft. The artificial horizon usually employs a gyro-stabilized element which shows roll and pitch but does not show vertical flight path. Vertical flight path may be presented as flight path angle with respect to horizontal flight, or rate of climb or descent with respect to horizontal flight. Vertical flight path information cannot be presented as pitch angle relative to the horizontal for the reason that pitch attitude relative to the horizontal does not in itself provide vertical flight path information as there is a different pitch attitude for any given flight path each time speed, weight, wing position or power is changed.

With prior art instruments, it is necessary, in order to obtain vertical flight path information to observe several of the following instruments: altimeter, rate of climb, airspeed, radio altimeter, accelerometer, or artificial horizon, depending on the specific conditions of flight at the time such information is desired. The altimeter is normally not used as a vertical flight path indicator except in level flight, while the radio altimeter is not used except for level flight over water. The conventional rate of climb indicator provides too much lead and lag hence is used primarily as a source of factual information and not as a reference from which to make control changes directly. Many rate of climb indicators do not fulfill the requirement of providing useable rate of climb information due to the system employed in giving rate value to altitude change intelligence. The airspeed indicator, while it provides a direct reference from which to make nose position control changes in climbs and descents, lacks the capability of providing factual information of level flight, rate of climb, or rate of descent. The accelerometer is used as the primary nose control instrument only during high positive "G" maneuvers or the approach to negative "G" maneuvers. It is used to prevent overstress by positive "G" or to prevent fuel and oil starvation in the power plant by negative "G."

The artificial horizon is used as the primary control instrument but under most conditions must be used in conjunction with other instruments, i.e., airspeed, altimeter, or rate of climb for vertical flight path information. Where the indicated airspeed, load, and power setting are constant and the wings are kept level, the artificial horizon will provide an absolute vertical flight path indication. However, if the indicated airspeed, load, power setting, or wing position is varied, there will be a new position of the horizon bar with respect to the reference airplane mark for maintaining the aircraft at constant altitude. In addition to the foregoing variables, the aircraft is subject to accelerations (particularly those accelerations resulting from the centrifugal forces of a turn) and under such conditions the gyro precesses. This precession is in the order of one to ten degrees, depending on the speed of the aircraft and the angle of bank or rate of turn. If the same level flight indication is maintained on such an instrument throughout a turn, there is a period of one to three minutes of actual climb or descent of the aircraft due to this precession. The rate of descent resulting from high speed turns may exceed 5000 feet per minute. Therefore, a considerable and dangerous loss of altitude may occur during such turns unless other instruments are observed and the necessary corrections are made in nose attitude.

As has heretofore been shown, the requirement for vertical flight path information in terms of rate of climb or descent or in terms of vertical flight path angle is not fulfilled by any single prior art instrument.

Finally, the prior art fails to disclose wherein vertical flight path and wing position information is included in a single instrument. If such information were available in a single instrument, all other information could be relegated to the category of quantitative factual flight information thus permitting simplification of the design thereof in that the requirement for great sensitivity would be obviated.

An object of the present invention is to provide a single instrument which combines in a novel manner the functions of a plurality of instruments used in piloting an aircraft.

Another object is to provide a novel aircraft instrument combining a plurality of functions which makes for convenient reading by the pilot especially during dangerous or difficult maneuvers.

A further object is to provide a novel aircraft instrument which combines the indications of a plurality of aircraft instruments on a single dial for convenient reading by the pilot.

A still further object is to provide an aircraft instrument which combines in a novel manner the indications of a plurality of sources including wing position intelligence, rate of climb/descent intelligence, angle of attack intelligence, and altitude intelligence.

Other objects and many of the attendant advantages of this invention will be readily appreciated as the same becomes better understood by reference to the following detailed description when considered in connection with the accompanying drawings wherein.

Figure 1:
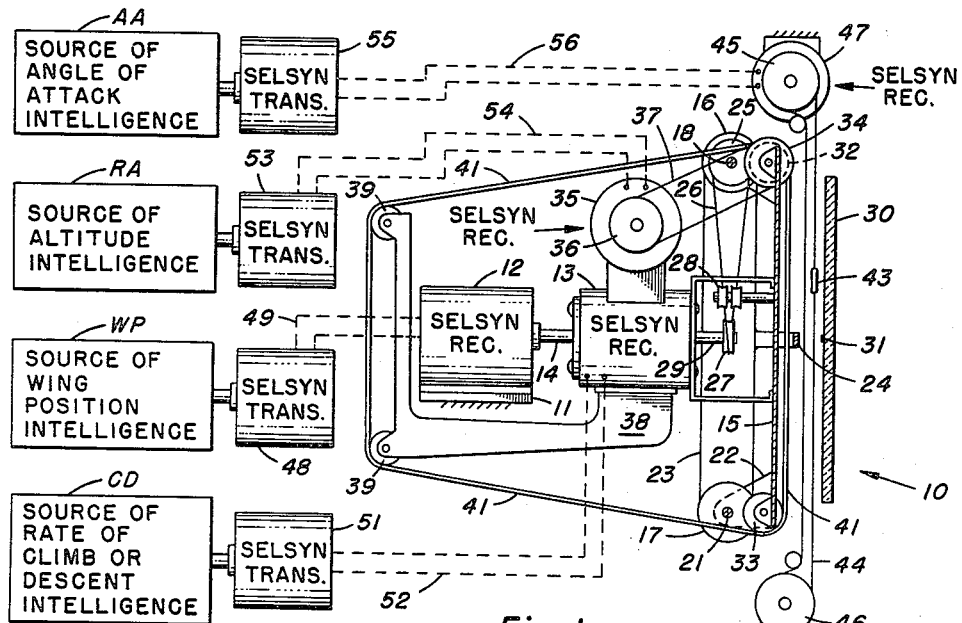
Fig. 1 is a schematic view of the device of the present invention partly in section and taken along line 1—1 of Fig. 2.
Figure 2:
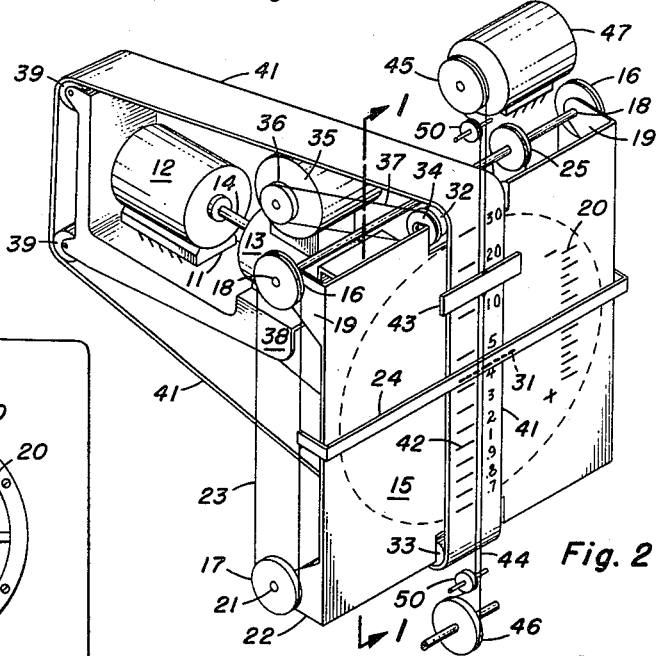
Fig. 2 is perspective view of the device.
Figure 3:
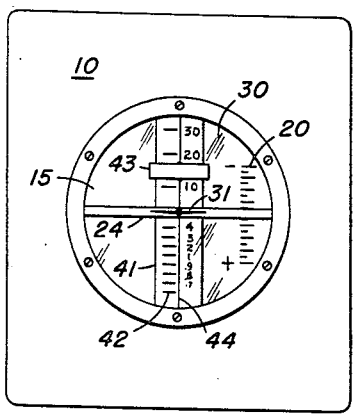
Fig. 3 is a front elevation of the instrument of the present invention.

Referring more particularly to the drawings wherein like numerals indicate like parts throughout the several views, 10 indicates generally the instrument of the present invention. A base 11 fixed relative to the craft has mounted thereon a selsyn receiver 12 having a shaft 14 which rotates the casing of selsyn receiver 13 as will be hereinafter more fully described. A pulley support and dial 15 is fixed to receiver 13 for rotation with the casing thereof in response to the rotation of shaft 14 of receiver 12. Support 15 is provided with pairs of upper and lower pulleys 16 and 17 respectively. Upper pulleys 16 are mounted on opposite ends of shaft 18 rotatably supported in ears 19 of support 15 while lower pulleys 17 are mounted on opposite ends of shaft 21 rotatably supported by ears 22 of support 15. Belts 23 pass over pulleys 16 and 17 on both sides of support 15. A bank and rate of change in altitude bar 24 is fixed at the opposite ends thereof to the belts 23 whereby bar 24 is maintained at right angles to the length of the belts. A scale 20 is inscribed on the dial 15 whereby the various positions of the bar 24 may be read in rate of climb or descent (feet per minute).

Shaft 18 has fixed thereon a pulley 25 over which a belt 26 is trained from a pulley 27 mounted on shaft 29 of selsyn receiver 13, a pair of idler pulleys 28 being interposed between pulleys 25 and 27. It will be seen from the foregoing that bar 24 may be moved up and down by belts 23 through rotation of shaft 27 of receiver 13. It will also be seen that the entire assembly supported by support 15 may be rotated by selsyn receiver 12 to any desired angle which will in effect tilt bar 24 without changing the position thereof with respect to the support 15.

A glass or other suitable transparent disc or window 30 is mounted fixedly in front of and spaced from the dial or support 15 and has inscribed centrally thereof a fixed reference mark or "miniature plane" 31.

A pair of spools 32 and 33 are mounted respectively at the upper and lower ends of support 15. A pulley 34 is fixed to spool 32 and is driven by a selsyn receiver 35 which is fixedly mounted on a portion of the rotating assembly, for example, on selsyn receiver 13. Selsyn receiver 35 is provided with a pulley 36 which drives pulley 34 through belt 37. A supporting arm 38 is fixed to a portion of the rotating assembly such for example as the casing of selsyn receiver 13 and extends beyond selsyn receiver 12 which is fixed by support 11. Arm 38 has a pair of spools 39 rotatably mounted thereon. A tape 41 having indicia thereon in the form of a scale 42, which may be non-linear, marked in feet of altitude is trained over spools 32, 33, and 39 thus to pass across the face of dial or support 15 and back beyond the fixed selsyn receiver 12. It is clear that altitude tape 41 may be moved across the face of dial 15 by selsyn receiver 35 and avoid contact with the fixed mechanism by passing over pulleys 39. It is also clear that the tape mechanism rotates in unison with dial 15 when it is rotated by selsyn receiver 12. The weight of arm 38 may be employed to counterbalance the weight of receiver 35 in that they are mounted diametrically opposite and rotate around the axis of rotation of the rotating mechanism.

An angle of attack bar 43 is supported for vertical movement in front of dial 15 and spaced therefrom in a manner to avoid interference with the bar 24. Bar 43 is fixed to a belt 44 which is supported on suitably mounted upper and lower pulleys 45 and 46 respectively. A selsyn receiver 47 drives pulley 45 thus to move angle of attack bar 43 up or down with respect to the fixed reference mark 31 on window 30. If desired pulleys 50 may be provided to bring the rear run of belt 44 close to the forward run thereof to cut down on the distance between the window 30 and the dial 15.

In order to drive selsyn receiver 12, a selsyn transmitter 48 is provided which in turn is driven by a source of wing angle position intelligence WP. The source WP may comprise a suitable gyro apparatus or other suitable mechanism which will indicate by rotation of selsyn transmitter 48 the degree of bank of the wing of the aircraft. As is well-known in the art, movement of the transmitter selsyn 48 will result in a corresponding movement of shaft 14 of selsyn receiver 12 through an electrical circuit 49. Shaft 14 rotates the casing of receiver 13 to which the support 15 is fixed; thus, support 15 and bar 24 will be tilted to an angle corresponding to the angle sensed by the source WP.

In like manner the rate of climb or descent is indicated by the vertical movement of bar 24 with respect to scale 20. A source of rate of climb or descent intelligence in terms of feet per minute is substituted for conventional nose attitude information in terms of degrees of angle of nose attitude. The rate of climb or descent indicator source which is indicated at CD may be of any desired type suitable for the purpose and capable of providing reliable information such, for example, as that shown in Patent No. 2,369,788, issued May 30, 1942, to D. G. C. Luck for Rate of Climb Indicator. Source CD is connected to drive selsyn transmitter 51 which is connected through a suitable electrical circuit 52 to selsyn receiver 13 which drives bar 24 to positions with respect to scale 20 indicative of feet per minute of climb or descent.

A source of altitude intelligence RA is provided, such source may be a conventional aneroid or radar altimeter or other suitable combination altitude metering apparatus which drives a selsyn transmitter 53 which, in turn, drives the selsyn receiver 35 through electrical circuit 54. Selsyn receiver 35 drives tape 33 in the manner heretofore described thus moving altitude scale with respect to the fixed reference mark 31 in accordance with altitude intelligence received by the source RA.

A source of angle of attack intelligence AA, which may be of the type disclosed in U.S. Patent No. 2,660,056, issued to O. H. Schuck et al. for Angle of Attack Sensing Device or any source suitable for the purpose, is provided. Source AA drives selsyn transmitter 55 which drives, through electrical circuit 56, the selsyn receiver 47. Selsyn receiver 47 moves angle of attack bar 43, in the manner heretofore described, with respect to fixed reference mark 31 in accordance with intelligence received by source AA.

If desired any of the scales may have certain portions thereof more widely spaced or expanded such, for example, as the altitude scale in the lower altitude markings and the rate of climb or descent scale adjacent the 0 marking. In such case, the drive for the scales or indicators, of course, would be provided with cams or other means well known in the art to take care of the additional movement necessary for use with such expanded scales.

It is obvious, from the foregoing description, that there has been provided a flight control device which presents usable flight information in a compact and desirable form and which obviates the confusion of reading a plurality of widely spaced instruments heretofore necessary in piloting an aircraft along a desired flight path.

Figure 4:
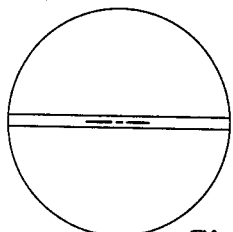
Figs. 4 through 9 are diagrammatic views showing various positions of the dial and indicator of a conventional artificial horizon instrument under certain conditions of flight.
Figure 10:
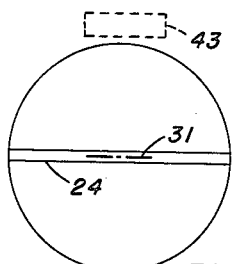
Figs. 10 through 15 are diagrammatic views showing comparative positions of the dial and indicators of the instrument of the present invention under the same conditions as in Figs. 4 through 9.

Figs. 4 through 9 show, in diagrammatic form, various positions of the dial and indicators of a conventional artificial horizon instrument during certain maneuvers while Figs. 10 through 15 show, in diagrammatic form, the positions of the dial and indicators of the flight control indicator of the present invention during the same maneuvers. Figs. 4 and 10 show the positions assumed by the indicators when the aircraft is traveling at high speed and in level flight wherein the conventional instrument shows the artificial horizon bar and the fixed reference mark in juxtaposition. In the instrument of the present invention the flight path bar 24, indicating zero rate of climb, and the fixed reference mark 31 are in alignment and the angle of attack bar 43 is out of sight above the dial.

Figure 5:
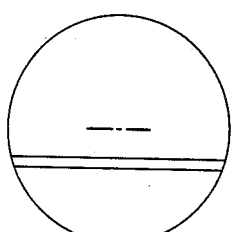
Figure 11:
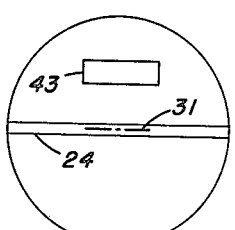

Figs. 5 and 11 show the indicators of the conventional instrument and of the instrument of the present invention, respectively, in the positions assumed thereby when the aircraft is at reduced carrier approach speed and in level flight. Under such conditions in the conventional instrument the artificial horizon bar is spaced a greater distance below the fixed reference mark while in the instrument of the present invention the flight path bar 24 remains at the position shown in Fig. 4 and the angle of attack bar 43 has moved to a position midway between the top of the dial and fixed reference mark 31.

Figure 6:
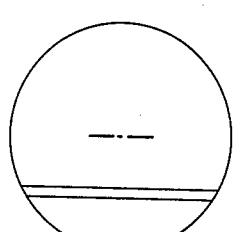
Figure 12:
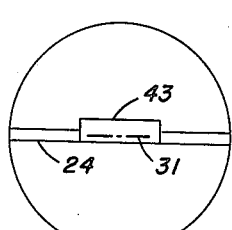

Figs. 6 and 12 show the indicators of the conventional and present invention instruments, respectively, in the positions assumed thereby when the aircraft is at stall speed and in level flight. In the conventional instrument the artificial horizon bar has reached a position still farther below the fixed mark, while in the instrument of the present invention the flight path bar 24 still indicates zero rate of climb and the angle of attack bar 43 is touching the fixed reference mark 31, thus indicating a stall condition. In this respect it is to be noted that the closer the bar 43 comes to mark 31 the greater the danger of stall.

Figure 7:
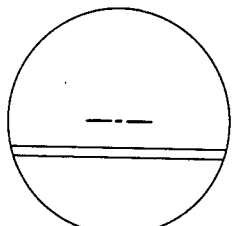
Figure 13:
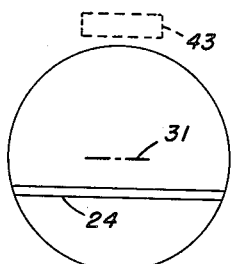

Figs. 7 and 13 show the indicators of the conventional and present invention instruments, respectively, in the positions assumed thereby when the attitude of the aircraft is 5° nose high and traveling at high speed and climbing. Under such conditions in the conventional instrument, the artificial horizon bar is spaced below the fixed reference mark, while in the instrument of the present invention the bar 24 is also in substantially the same position as the aforesaid artificial horizon bar and the angle of attack bar 43 is out of sight above the dial.

Figure 8:
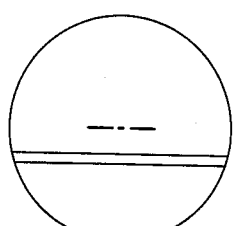
Figure 14:
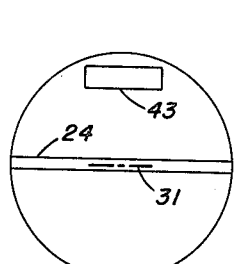

Figs. 8 and 14 show the indicators of the conventional and present invention instruments, respectively, in the positions assumed thereby when the attitude of the aircraft is 5° nose high and traveling at medium speed in level flight. Under such conditions the conventional instrument maintains the same reading as that shown in Fig. 7, while the instrument of the present invention shows the bar 24 in juxtaposition with the fixed reference mark 31 and the angle of attack bar 43 visible near the top of the dial.

Figure 9:
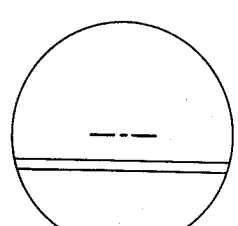
Figure 15:
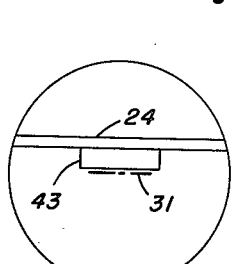

Figs. 9 and 15 show the indicators of the conventional and present invention instruments, respectively, in the positions assumed thereby when the attitude of the aircraft is 5° nose high and at stall speed and descending. The conventional instrument still maintains the same reading as that shown in Fig. 7, while the instrument of the present invention shows the bar 24 to be spaced above the fixed reference mark 31 and the angle of attack bar 43 contacting the fixed reference mark 31, thus indicating a stall condition.

Figure 16:
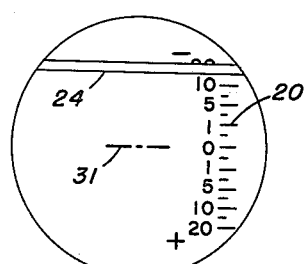
Fig. 16 shows the positions of the indicators of the present invention during rapid descent.

Fig. 16 shows the dial and bar 24 of the present invention in the position assumed thereby when the aircraft is descending at 20,000 feet per minute, 20° nose down, and at 600 knots true air speed. As shown, the bar 24 is in proper relation to the rate of climb and descent scale 20.

It is apparent from the foregoing that there is no warning of approach of stall in the conventional artificial horizon instrument in either level flight or 5° nose high attitudes of the aircraft, while there is ample warning of stall in the instrument of the present invention.

It is to be understood that while the device of the present invention has been described and illustrated as having the sources WP, CD, AA and RA remotely located with respect to the viewing instrument, the sources may, if desired, be housed within the casing of the viewing instrument.

Obviously many modifications and variations of the present invention are possible in the light of the above teachings. It is therefore to be understood that within the scope of the appended claims the invention may be practiced otherwise than as specifically described.

What is claimed is:

1. A flight control indicator for aircraft comprising, a reference mark, means for fixedly mounting said mark with respect to the aircraft, a dial rotatable with respect to said mark, a rate of climb scale inscribed on said dial, a bank and rate of change in altitude indicator mounted for movement across the face of said dial with respect to said fixed mark and said scale and mounted for rotation with said dial and with respect to said fixed mark, means for moving said indicator across said dial in accordance with the rate of change in altitude of said aircraft, and means for rotating said dial and said indicator in accordance with the wing position of said aircraft.

2. A flight control indicator for aircraft comprising, a reference mark, means for fixedly mounting said mark with respect to the aircraft, a dial rotatable with respect to said mark, a rate of climb scale inscribed on said dial, a bank and rate of change in altitude indicator mounted for movement across said dial with respect to said fixed mark and said scale and mounted for rotation with said dial, means for moving said indicator across said dial in accordance with the rate of change in altitude of said aircraft, means for rotating said dial and said indicator in accordance with the wing position of said aircraft, an altitude scale mounted on said dial for movement thereacross with respect to said fixed mark and for rotation therewith, and means for moving said altitude scale in accordance with the altitude of said aircraft.

3. A flight control indicator for aircraft comprising, a reference mark, means for fixedly mounting said mark with respect to the aircraft, a dial rotatable with respect to said mark, a rate of climb scale inscribed on said dial, a bank and rate of change in altitude indicator mounted for movement across the face of said dial with respect to said fixed mark and said scale and mounted for rotation with said dial and with respect to said fixed mark, means for moving said bank and rate of change in altitude indicator in accordance with the rate of change in altitude of said aircraft, means for rotating said dial and said bank and rate of change in altitude indicator in accordance with the wing position of said aircraft, an altitude scale mounted on said dial for movement thereacross with respect to said fixed mark and for rotation with said dial, means for moving said altitude scale in accordance with the altitude of the aircraft, an angle of attack bar fixed against rotation and movable with respect to said fixed mark, and means for moving said bar in accordance with the angle of attack of said aircraft.

4. A flight control indicator for aircraft comprising, a first selsyn receiver having the casing thereof fixedly mounted with respect to said aircraft, a second selsyn receiver having the casing thereof rotatable by said first selsyn receiver, a dial member fixedly mounted on the casing of said second selsyn receiver for rotation therewith, an indicator bar mounted on said dial member for rotation therewith and connected to said second selsyn receiver for movement thereby across said dial member, a first selsyn transmitter operatively connected to said first selsyn receiver, a second selsyn transmitter operatively connected to said second selsyn receiver, means driving said first selsyn transmitter in accordance with the bank angle of said aircraft, and means driving said second selsyn transmitter in accordance with the rate of change in altitude of said aircraft.

5. A flight control indicator for aircraft comprising, a first selsyn receiver having the casing thereof fixedly mounted with respect to said aircraft, a second selsyn receiver having the casing thereof rotatable by said first selsyn receiver, a dial member fixedly mounted on the casing of said second selsyn receiver for rotation therewith, an indicator bar mounted on said dial member for rotation therewith and operatively connected to said second selsyn receiver for movement thereby across said dial member, means for transmitting a signal in accordance with angle of bank of said aircraft to said first selsyn receiver thereby to rotate said dial and said indicator bar to an angle indicative of said angle of bank, and means for transmitting a signal in accordance with rate of change in altitude of said aircraft to said second selsyn receiver thereby to move said indicator across said dial to a position indicative of said rate of change.

6. A flight control indicator for aircraft comprising, a first selsyn receiver having the casing thereof fixedly mounted with respect to said aircraft, a second selsyn receiver having the casing thereof rotatable by said first selsyn receiver, a dial member fixedly mounted on the casing of said second selsyn receiver for rotation therewith, an indicator bar on said dial member for rotation therewith and connected to said second selsyn receiver for movement thereby across said dial member, a first selsyn transmitter operatively connected to said first selsyn receiver, means driving said first selsyn transmitter in accordance with bank angle of said aircraft, a second selsyn transmitter operatively connected to said second selsyn receiver, means driving said second selsyn transmitter in accordance with the rate of change in altitude of said aircraft, a third selsyn receiver having the casing thereof fixed to the casing of said second selsyn receiver for rotation therewith, a fixed reference mark, an altitude scale mounted for movement across said dial member with respect to said reference mark and operatively connected to said third selsyn receiver, a third selsyn transmitter operatively connected to said third selsyn receiver, and means driving said third selsyn transmitter in accordance with the altitude of said aircraft.

7. A flight control indicator for aircraft comprising, a reference mark, means for fixedly mounting said mark with respect to the aircraft, a dial rotatable with respect to said mark, a rate of climb scale on said dial, a bank and rate of change in altitude bar mounted for movement across the face of said dial with respect to said fixed mark and said scale and mounted for rotation with said dial and with respect to said mark, means for moving said bank and rate of change in altitude bar in accordance with the rate of change in altitude of said aircraft, means for rotating said dial and said bank and rate of change in altitude bar in accordance with the wing position of said aircraft, an angle of attack bar fixed against rotation and movable with respect to said mark, and means for moving said angle of attack bar in accordance with the angle of attack of said aircraft.

8. A flight control indicator for aircraft comprising, a first selsyn receiver having the casing thereof fixedly mounted with respect to said aircraft, a second selsyn receiver having the casing thereof rotatable by said first selsyn receiver, a dial fixedly mounted on the casing of said second selsyn receiver for rotation therewith, an indicator bar on said dial member for rotation therewith and connected to said second selsyn receiver for movement thereby across said dial member, a first selsyn transmitter operatively connected to said first selsyn receiver, means driving said first selsyn transmitter in accordance with angle of bank of said aircraft, a second selsyn transmitter operatively connected to said second selsyn receiver, means driving said second selsyn transmitter in accordance with the rate of change in altitude of said aircraft, a third selsyn receiver having the casing thereof fixed with respect to said dial and rotatable therewith, a transparent window fixedly mounted in front of said dial, a fixed reference mark on said dial, an altitude scale mounted for movement across said dial with respect to said reference mark and operatively connected to said third selsyn receiver, a third selsyn transmitter operatively connected to said third selsyn receiver, means driving said third selsyn transmitter in accordance with the altitude of said aircraft, a fourth selsyn receiver having the casing thereof fixedly mounted with respect to said aircraft, an angle of attack bar mounted for movement across said dial and connected to said fourth selsyn receiver for movement thereby, a fourth selsyn transmitter operatively connected to said fourth selsyn receiver, and means for driving said fourth selsyn transmitter in accordance with the angle of attack of said aircraft.

9. A flight control indicator for aircraft comprising, a reference mark, means for fixedly mounting said mark with respect to the aircraft, a dial, a fixed rate of change in altitude scale on said dial, an indicator mounted for movement on said dial with respect to said scale and said mark, means for moving said indicator in accordance with the rate of change of altitude of said aircraft, an altitude scale mounted on said dial for movement thereacross with respect to said fixed mark and said first mentioned scale, means for moving said altitude scale in accordance with the instant altitude of said aircraft, an angle of attack bar mounted for movement across said dial with respect to said fixed mark and said first and second mentioned scales, and means for moving said bar in accordance with the angle of attack of said aircraft, whereby a single instrument is capable of indicating the danger of stall condition during a change of altitude and during level flight, and of indicating both the rate of climb or descent and the instant altitude of the aircraft.

10. A flight control indicator for aircraft comprising, a reference mark, means for fixedly mounting said mark with respect to the aircraft, an angle of attack bar mounted for movement with respect to said mark, means for moving said bar in accordance with the angle of attack of said aircraft, a rate of change in altitude scale adjacent said mark and fixedly attached to the aircraft, a rate of change in altitude indicator mounted for movement with respect to said scale and said mark, and means for moving said rate of change of altitude indicator in accordance with the rate of change in altitude of said aircraft, whereby a single instrument is capable of indicating the danger of stall condition during a change in altitude and during level flight, and of indicating the rate of climb or descent of the aircraft.

11. A flight control indicator for aircraft comprising, a reference mark, means for fixedly mounting said mark with respect to the aircraft, an angle of attack bar mounted for movement with respect to said fixed mark, means for moving said angle of attack bar in accordance with the angle of attack of said aircraft, and altitude scale mounted for movement with respect to said fixed mark and said angle of attack bar, means for moving said altitude scale in accordance with the altitude of said aircraft, an angle of bank indicator mounted for rotation with respect to said fixed mark and said angle of attack bar, and means for moving said angle of bank indicator in accordance with angle of bank of said aircraft, whereby a single instrument is capable of indicating the danger of stall condition during a change of altitude and in level flight, and of indicating the angle of bank and the instant altitude of the aircraft.

12. A flight control indicator for aircraft comprising, a reference mark, means for mounting said mark with respect to the aircraft, an altitude scale mounted for movement with respect to said fixed mark, means for moving said scale in accordance with the altitude of said aircraft, a dial, a rate of change in altitude scale on said dial, a combined rate of change in altitude and angle of bank indicator means mounted for translational movement across said dial with respect to said scale and mounted for rotation with respect to said fixed mark, whereby said indicator means indicates rate of change in altitude of said aircraft when moved with respect to said scale and indicates angle of bank when rotated with respect to said fixed reference mark.

13. A flight control indicator for aircraft comprising, a reference mark, means for mounting said mark with respect to the aircraft, an angle of attack bar mounted for movement with respect to said fixed mark, means for moving said angle of attack bar in accordance to the angle of attack of said aircraft, a dial having a rate of change in altitude scale thereon, a combined rate of change in altitude and angle of bank indicator means mounted for translational movement across said dial and mounted for rotational movement with respect to said fixed mark, whereby said indicator means indicates rate of change in altitude of said aircraft when moved moved translationally and indicates the angle of bank of said aircraft when rotated.

14. A flight control indicator for aircraft comprising, a fixed window, a reference mark fixedly mounted on said window, a dial mounted for viewing through said window, a fixed rate of change of altitude scale on said dial, an angle of attack bar mounted for movement with respect to said fixed mark and said rate of change of altitude scale, means for moving said angle of attack bar in accordance with the angle of attack of said aircraft, an altitude scale mounted on said dial for movement thereacross with respect to said fixed mark, means for moving said altitude scale in accordance with the altitude of said aircraft, a combined rate of change in altitude and angle of bank indicator mounted for movement across said rate of change of altitude scale and mounted for rotation with respect to said fixed mark, means providing said movement across said rate of change of altitude scale and rotation whereby the indicator is caused to moved with respect to said rate of change scale in accordance with the rate of change in altitude of said aircraft and to rotate in accordance with the angle of bank of said aircraft.

15. A flight control indicator for aircraft comprising, a reference mark, means for fixedly mounting said mark with respect to the aircraft, an angle of attack bar mounted for movement with respect to said fixed mark, means for moving said angle of attack bar in accordance with the angle of attack of said aircraft, an altitude scale mounted for movement with respect to said fixed mark and said angle of attack bar, and means for moving said altitude scale in accordance with the altitude of said aircraft, whereby a single instrument is capable of indicating the instant altitude of the aircraft and the danger of stall condition.

16. A flight control indicator for aircraft comprising, a reference mark, means for fixedly mounting said mark with respect to the aircraft, an angle of attack bar mounted for movement with respect to said fixed mark, means for moving said angle of attack bar in accordance with the angle of attack of said aircraft, an altitude scale mounted for movement with respect to said mark and said angle of attack bar, means for moving said altitude scale in accordance with the altitude of said aircraft, an angle of bank indicator rotatably mounted with respect to said mark, angle of attack bar and altitude scale, means for rotating said angle of bank indicator in accordance with the angle of bank of said aircraft, whereby a single instrument is capable of indicating the instant altitude during bank of said aircraft, the danger of stall condition during a change in altitude and in level flight, and the angle of bank of said aircraft.

References Cited in the file of this patent

UNITED STATES PATENTS

| | | |
|---|---|---|
| 2,053,182 | Crane et al. | Sept. 1, 1936 |
| 2,055,495 | Howard | Sept. 29, 1936 |
| 2,579,902 | Carbonara et al. | Dec. 25, 1951 |
| 2,582,796 | Reid | Jan. 15, 1952 |
| 2,656,721 | Melchior | Oct. 27, 1953 |
| 2,685,226 | Crane | Aug. 4, 1954 |
| 2,718,783 | Anastasia | Sept. 27, 1955 |
| 2,737,640 | Barnaby | Mar. 6, 1956 |
| 2,892,180 | Smith | June 23, 1959 |

FOREIGN PATENTS

| | | |
|---|---|---|
| 603,383 | Great Britain | Oct. 19, 1945 |